US008666096B2

(12) United States Patent
Mussel

(10) Patent No.: US 8,666,096 B2
(45) Date of Patent: Mar. 4, 2014

(54) DEVICE AND PROCESS FOR USING AUDIO PLUG-INS IN A MIXER

(75) Inventor: Jan Christopher Mussel, Wiesbaden (DE)

(73) Assignee: Lawo AG, Rastatt (DE)

( * ) Notice: Subject to any disclaimer, the term of this patent is extended or adjusted under 35 U.S.C. 154(b) by 1195 days.

(21) Appl. No.: 12/593,048

(22) PCT Filed: Mar. 20, 2008

(86) PCT No.: PCT/EP2008/002227

§ 371 (c)(1), (2), (4) Date: Sep. 25, 2009

(87) PCT Pub. No.: WO2008/122351

PCT Pub. Date: Oct. 16, 2008

(65) Prior Publication Data

US 2010/0119084 A1 May 13, 2010

(30) Foreign Application Priority Data

Apr. 4, 2007 (DE) ........................ 10 2007 016 274

(51) Int. Cl.
*H04B 1/00* (2006.01)
*G06F 17/00* (2006.01)

(52) U.S. Cl.
USPC .............................. 381/119; 700/94; 715/727

(58) Field of Classification Search
USPC ......... 381/119, 61-63; 700/94; 715/716, 700, 715/727; 84/625, 660, 697
See application file for complete search history.

(56) References Cited

U.S. PATENT DOCUMENTS 6,069,311 A * 5/2000 Hiramatsu ...................... 84/659
7,865,601 B2 * 1/2011 Yamamoto et al. ........... 709/227
(Continued)

FOREIGN PATENT DOCUMENTS

DE 101 46 887 4/2003
EP 1 507 359 A1 2/2005
(Continued)

OTHER PUBLICATIONS

Yamaha Digital Mixing Console O2R96 Version 2, Japan, Yamaha Corporation, 2005, 1, 14-16, 58, 199-352, URL http://www2.yamaha.co.jp/manual/pdf/pa/japan/mixers/02r96v2_ja_om_e0.pdf (refer to English page, URL http://www2.yamaha.co.jp/manual/pdf/pa/english/mixers/02r96v2_om_en_g0.pdf).

*Primary Examiner* — Xu Mei
(74) *Attorney, Agent, or Firm* — McGlew and Tuttle, P.C.

(57) ABSTRACT

The present invention pertains to a device for using audio plug-ins in a mixer, provided with a mixer and a computer, whereby the mixer has a control panel and signal-processing electronics and the computer has an audio interface, and audio plug-ins can be installed on it, in which an audio plug-in host is installed on the computer for receiving plug-ins, that the mixer has a plug-in control system, that computer and mixer are connected to one another by means of audio tie lines and at least one control line, and that the entire control, including that of the audio plug-ins, can be carried out by the mixer. Furthermore, the present invention proposes a process for using audio plug-ins in a mixer, in which audio plug-ins to be used are automatically sought by a control system of the mixer in a file folder containing plug-ins installed on a computer, and that the audio plug-ins are each assigned to an effect slot (FX slot), whereby the audio tie lines required for this are occupied, as a result of which the audio plug-in is available for use in the mixer.

17 Claims, 3 Drawing Sheets

(56) References Cited

U.S. PATENT DOCUMENTS

| | | | | |
|---|---|---|---|---|
| 8,180,063 | B2 * | 5/2012 | Henderson | 381/61 |
| 2002/0065568 | A1 | 5/2002 | Silfvast et al. | |
| 2006/0152398 | A1 | 7/2006 | Jubien et al. | |
| 2007/0046980 | A1 | 3/2007 | Coleman et al. | |
| 2008/0244081 | A1 * | 10/2008 | Elangovan et al. | 709/231 |

FOREIGN PATENT DOCUMENTS

| | | | |
|---|---|---|---|
| EP | 1 580 910 | A2 | 9/2005 |
| GB | WO 2004/079486 | | 9/2004 |
| WO | WO 03/087980 | | 10/2003 |

* cited by examiner

DEVICE AND PROCESS FOR USING AUDIO PLUG-INS IN A MIXER

The present invention pertains to a device for using audio plug-ins in a mixer, provided with a mixer and a computer, whereby the mixer has a control panel and signal-processing electronics and the computer has an audio interface and plug-ins can be installed on it, as well as to a a process for using audio plug-ins in a mixer.

Audio plug-ins are software-based implementations for changing sound or for producing sound. The present invention pertains especially to audio plug-ins of virtual studio technology (VST). This is an interface for software in the audio field, which makes dialog possible between a so-called VST host, such as an audio workstation and virtual instruments or effects, which can consequently be operated as plug-ins within an audio workstation. This VST interface is the most widely used one, so that the present invention refers to same, in particular.

Up to now, audio plug-ins have especially been used in so-called digital audio workstations (DAW). In this case, a plug-in is used in a signal path of the audio workstation, so that sound processing is available within a single channel. By means of plug-ins, the widest variety of sound changes are thus possible, such as simple changing of the tone color (equalizer), Hall effects, but also noise removal and crackling removal, for example, on old vinyl records, etc. Since such plug-ins are available for different purposes and effects in digital audio workstations, the sound change possibilities generated hereby are increasingly also required in professional mixers that can be used directly and especially also at events, such as concert events (where such audio workstations, of course, cannot be used). To be able to use audio plug-ins developed for audio workstations in digital mixers, these plug-ins have to be adapted. If a mixer manufacturer should want to develop such audio plug-ins for use for its mixers and for direct use in same itself, then this would mean a doubling of the labor. Such audio plug-ins often also create a "personal" tone color of the developer, which may be desired.

Therefore, the basic object of the present invention is to create, while avoiding the above-mentioned drawbacks, a device and a process, by means of which conventional audio plug-ins, as they are used in digital audio workstations, are also made usable for use in mixers to make available to the user of mixers the same result in operation and use, as is given in digital audio workstations.

To accomplish the said object, the present invention provides a device of the type mentioned in the introduction, which is characterized in that an audio plug-in host is installed on the computer for the receipt of plug-ins, that the mixer has a plug-in control system, that the computer and the mixer are connected to one another by means of audio tie lines and at least one control line, and that the entire control, including that of the audio plug-ins, can be carried out by the mixer.

Furthermore, to accomplish the said object in a process of the above-mentioned type, the present invention provides that audio plug-ins to be used are automatically sought by a control system of the mixer in a file folder containing plug-ins installed on a computer, and that the audio plug-ins are each assigned to an effect slot (FX slot), whereby the audio tie lines required for this [effect slot] are occupied, as a result of which the audio plug-in is available for use in the mixer.

Thus, according to the present invention, an audio mixer, usually a digital audio mixer, is connected directly to a computer, whereby it may be a high-performance PC with a usual operating system running on such computers. The computer has an audio interface, whereby this may be any type, for example, an AES interface (AES stereo IN/OUT) or an AES-10 interface. The control tie line is preferably an Ethernet-based TCP/IP tie line. The audio plug-in host receives and transfers value changes via the interface to an audio plug-in, whereby it does not manage the value changes itself, but rather sends them to the control system of the mixer, which manages, changes and stores these.

For the core of the mixer control system there is no difference between its own DSP parameters and plug-in parameters. Only communication with audio processing, in one case by means of ATM for DSP card, especially a proprietary DSP card, and in another case by means of TCP/IP to the plug-in host and then to the plug-in, is different. All operations that can be applied to mixer parameters also apply to plug-in parameters.

Moreover, the device according to the present invention is preferably embodied in that the control system has effect slots (FX slots) and/or that the mixer is provided with a graphic user interface (GUI). A plug-in or effect slot is a virtually free space for a plug-in instance.

Variants of the process according to the present invention provide that in allocating a plug-in to an effect slot, free audio tie lines are automatically occupied and again released for this [effect slot] when the respective effect slot is deactivated, whereby especially in allocating an audio plug-in to an effect slot, a data set with name and all parameters of the audio plug-in is set up and managed exclusively by the control system of the mixer, as a result of which all parameters of the audio plug-in can be controlled by the mixer on the computer.

Furthermore, for processing, the present invention provides, in a preferred embodiment, that the allocation of the audio plug-ins to a respective FX slot as well as the audio tie lines are carried out in the highest file instance of the control system of the mixer, and/or that the data set of the audio plug-in is stored completely in the snapshot or in the pass of the dynamic automation of the control system of the mixer and when the snapshot or the automation pass is reproduced, the audio plug-ins are parameterized on the computer automatically with the data of the respective data set from the control system, whereby in the latter case especially the stored data from the control system of a mixer can be transferred to the control system of another mixer.

Moreover, provisions may be made according to the present invention that, when an audio plug-in cannot be found on the computer when an audio production and/or data set is loaded, the data concerning the audio plug-in are ignored, but the production, snapshot and automation data are loaded.

According to an extremely preferred embodiment of the device according to the present invention, provisions are made that the computer has an RDP server and the mixer has an RDP client and the computer can in this way be operated by the mixer by means of the RDP protocol. Accordingly, the process according to the present invention provides in a variant that windows of the graphic user interface of the audio plug-ins are completely transferred by means of an RDP client installed on the mixer to a display unit of the mixer, whereby especially when accessing the RDP client of the mixer on the computer, a user currently logged on there is automatically logged off and a user access is set up exclusively for the control system of the mixer, and/or windows of the audio plug-in on the computer are automatically switched to full frame and in this way other menu and task bars are hidden on the display unit, so that only the windows of the audio plug-ins are displayed on the display unit and direct access to the computer is blocked in this way.

Further advantages and features of the present invention arise from the claims and the following description, in which an exemplary embodiment of the device according to the present invention is explained in detail with reference to the drawings, in which:

Figure 1:
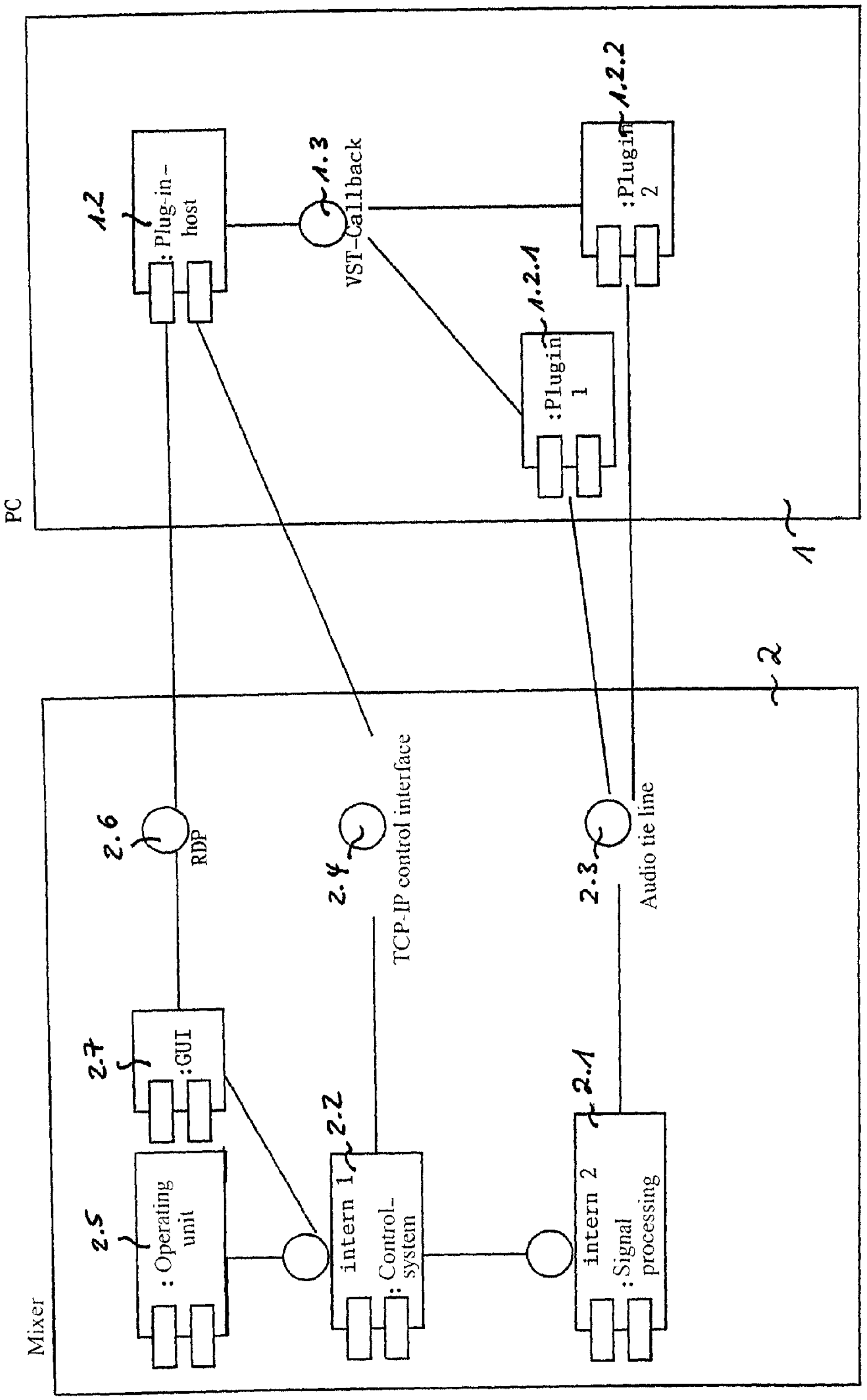
FIG. 1 shows the system structure of a device according to the present invention.

The device according to the present invention has a conventional computer 1, such as a powerful PC with a usual operating system. Furthermore, the device according to the present invention contains a digital mixer 2.

The computer 1 has especially an audio IN/OUT interface 1.1. Furthermore, a plug-in host or server 1.2 is installed on it, and plug-ins 1.2.1, 1.2.2 are stored on it, which can be processed for controlling the plug-ins upon request of the mixer 2 or of a control system 2.2. The communication of the audio plug-ins [sic, obvious typo in original—Tr.] with the plug-in host takes place via a VST callback 1.3.

Furthermore, the mixer 2 has signal-processing electronics 2.1, which are connected internally to the plug-in control system 2.2 and further to the computer 1 or its audio IN/OUT interface via audio tie lines 2.3.

Further, the control system 2.2 is connected to a plug-in server 1.2 of the computer 1 via a TCP/IP interface 2.4 and a control line 3.2. The plug-ins are operated by means of an operating unit 2.5 of the mixer via the RDP protocol, for which an RDP host (not shown) is present on the computer and an RDP client (likewise not shown) with a graphic user interface 2.7 (GUI) is present on the mixer.

The sequence of the process according to the present invention is as follows:

The control system 2.2 of the mixer 2 automatically searches for the file folder or file folders of the audio plug-ins 1.2.1, 1.2.2 installed on the computer 1 and optionally acknowledges plug-ins known to it.

Such an audio plug-in is allocated to a logical effect slot (FX slot). This [effect slot] automatically occupies the audio tie lines required for the corresponding audio plug-in. For example, two tie lines are allocated to an effect slot for a stereo plug-in and six tie lines are allocated for a surround 5.1 plug-in. In the device according to the present invention, 256 logical effect slots, for example, are available. The maximum number of effect slots may be expanded as desired. Access to the tie lines is dynamic. Free tie lines are automatically allocated to the effect slots and released again when such an effect slot is deactivated.

A plug-in slot or effect slot can be randomly selected by the user. The individual instances of the plug-ins are identified based on the slots allocated to them. A user has, e.g., two plug-ins, one a space simulation plug-in and one a "tube distorter" installed on his server. These are available to him only repeatedly for instantiations, limited only by the computing performance of the VST server. It selects a Hall effect in a first slot, another one in a second slot and a distortion in a third slot. The allocation to slots enables it to assign different parameter sets to the instances and also to store these in snapshots. Also, the audio resources (inputs and outputs of the plug-ins) formed are accessible in the crossbar based on the slot.

In the allocation of an audio plug-in to an effect slot, a data set is set up, which contains especially a name and all the parameters of the audio plug-in. The data set is managed by the control system 2.2 of the mixer 2, as a result of which the latter is able to control all the parameters of the audio plug-in on the computer 1. No data set data are stored on the computer 1. This [computer] serves only as an audio plug-in host or server 1.2 as well as a tie line/channel to the control system 2.2 of the mixer 2.

The allocation of an audio plug-in to an effect slot as well as the quantity of audio tie lines used takes place preferably in the highest file instance of the control system 2.2 of the mixer, of the so-called production. When a production is loaded, the plug-in is sought and processed in the above-described manner.

Moreover, the data set of an audio plug-in can be completely stored in the snapshot or in the pass of the dynamic automation of the control system 2.2 of the mixer 2. Mixer automation means here the recording, storage and reproduction of control states of defined mixer parameters. When such snapshots or an automation pass are reproduced, the audio plug-ins on the computer 1 are automatically parameterized with the data of the data set from the control system 2.2.

Figure 2:
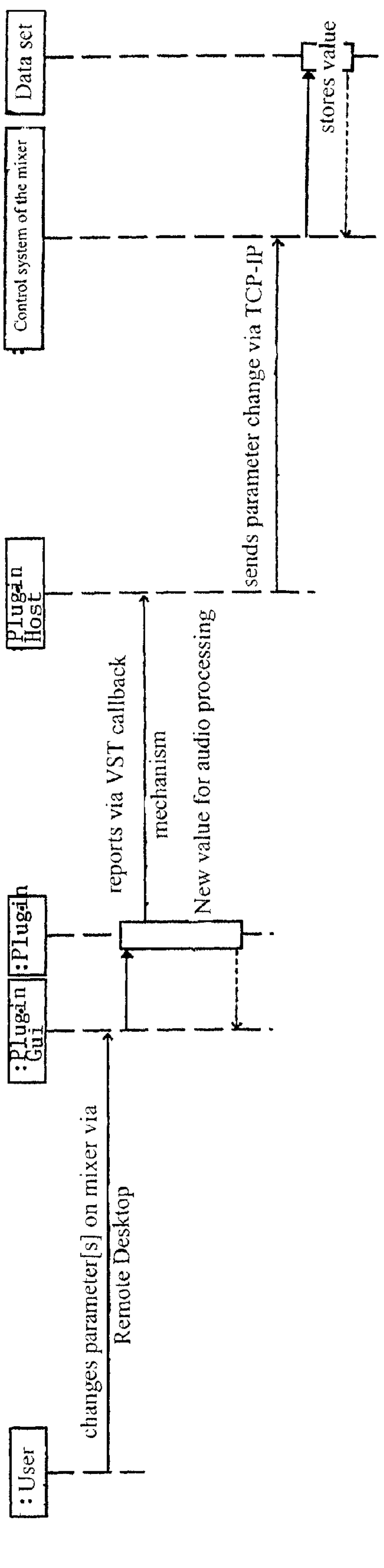
FIG. 2 shows the sequence in a parameter change by a user.
Figure 3:
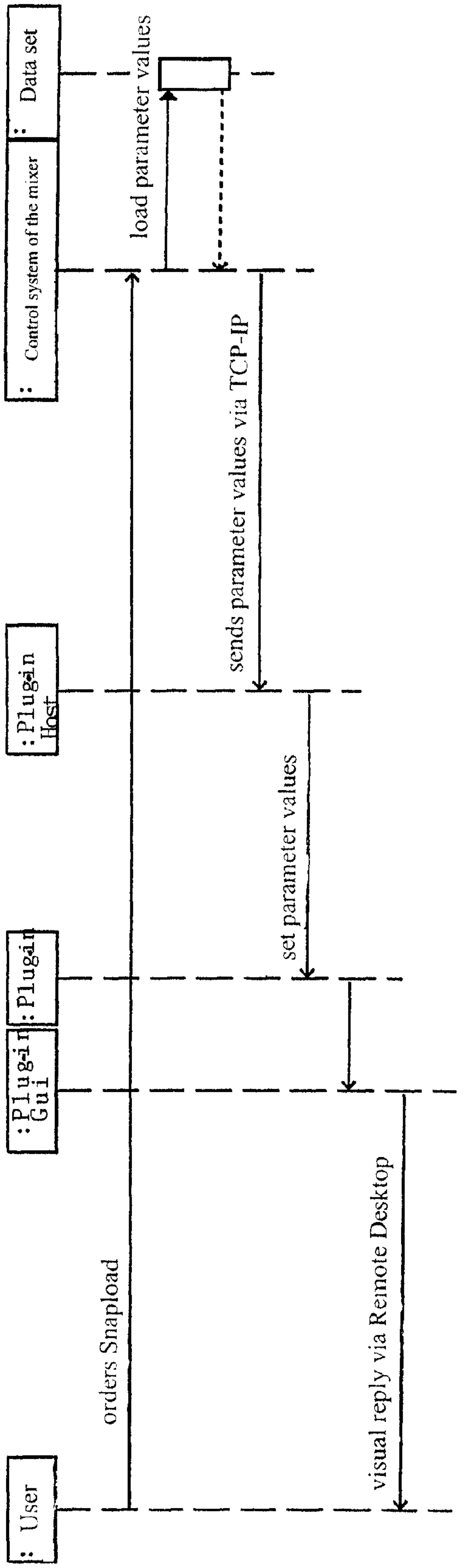
FIG. 3 shows the loading of stored values.

FIG. 2 represents in a diagram the sequences in case of changes made in plug-in parameters by a user. The user changes the parameter on the Remote Desktop mixer by means of the plug-in GUI. This is communicated to the plug-in, which reports the change via a VST callback mechanism to the plug-in host of the computer, which in turn reports the parameter changes via TCP/IP to the control system of the mixer, which stores the new value in the data set. Moreover, the new value for audio processing is displayed in the plug-in GUI.

Diagram 3 represents the sequence, interaction or sequences when loading stored parameter values. In this case, the user orders the control system of the mixer to load the parameters from the data set, which sends these via TCP/IP to the plug-in host after loading the parameter values. This [plug-in host] sets the parameter values of the plug-in, which are then in turn displayed on the plug-in GUI, as a result of which a visual [sic, obvious typo—Tr.] reply to the user takes place via Remote Desktop.

The data stored in this way can be transferred entirely by a control system 2.2 of a mixer to another control system, even if the operating and audio hardware connected to the other control system is set up differently.

When a plug-in cannot be found on the computer 1 when the production or data set is loaded because it is not installed there, the data concerning this [plug-in] are ignored, but the production snapshot and automation data are loaded nevertheless.

For operating and visualizing audio plug-ins, the windows of an audio plug-in are entirely exported to the graphic user interface 2.7 of the mixer, and, according to the exemplary embodiment shown, by means of an RDP client, which is installed on the control system 2.2. This may be an RDP client 2.6 of a common operating system (Linux, Windows). The RDP client 2.6 accesses the RDP host or server installed on the computer 1 (since the RDP protocol is a protocol created by Microsoft, a Windows server). To reliably rule out interferences and errors in the audio processing by means of audio plug-ins 1.2.1, 1.2.2 installed on the computer, when accessing the RDP client 2.6 on the computer, the user currently logged on there can be logged off, and provisions can be made that a user access can be made exclusively for the control system 2.2 of the mixer 2. Furthermore, the windows of the audio plug-in host on the computer are automatically switched to full frame, which means that menu and task bars of the operating system or of its graphic user interface are hidden, so that only the windows of the audio plug-in host are exported to the graphic user interface and thus direct access to the computer is blocked at this [audio plug-in host].

LIST OF REFERENCE NUMBERS

1 Computer
1.1 Interface
1.2 Plug-in host or server
1.2.1 Plug-ins
1.2.2 Plug-ins
1.3 VST callback
2 Mixer
2.1 Electronics
2.2 Control system
2.3 Audio tie line
2.4 TCP-IP interface
2.5 Operating unit
2.6 RDP client
2.7 User interface
3.2 Control line
3.3 Control line

The invention claimed is:

1. A device for using software audio plug-ins in a mixer, the device comprising:

a mixing console; and a computer, whereby the mixing console has a control panel and an electronic signal-processing system and the computer has an audio interface on which audio software plug-ins can be installed, wherein an audio plug-in host for recording more than one of said audio software plug-ins is installed on the computer, the mixing console having a plug-in control system for allocation of each of said audio software plug-ins to one of several effects slots, the computer and the mixing console being connected via an audio tie line and at least one control line, said plug-in control system of said mixing console exclusively managing a name and all parameters of data of said audio software plug-ins, wherein the entire control, including that of the audio software plug-ins, is effected exclusively from the mixing console.

2. A device in accordance with claim 1, wherein the mixing console is provided with a graphic user interface (GUI).

3. A device in accordance with claim 1, wherein the computer has an RDP server and the mixing console has an RDP client, and the computer can in this way be operated by the mixing console by means of the RDP protocol.

4. A method for using software audio plug-ins in a mixer, the method comprising:

providing a mixing console and a computer, whereby the mixing console has a control panel and an electronic signal-processing system and the computer has an audio interface on which software audio plug-ins can be installed, wherein an audio plug-in host for recording more than one of said software audio plug-ins is installed on the computer, the mixing console having a plug-in control system for allocation of each of said software audio plug-ins to one of several effects slots, the computer and mixing console being connected one or more audio tie lines and at least one control line;

automatically searching said software audio plug-ins to be used by said control system of the mixing console in a file folder containing said software audio plug-ins installed on said computer;

assigning each of the software audio plug-ins one of several effects slots, whereby the one or more audio tie lines required for said effects slot are used such that the software audio plug-ins are available for use in the mixing console; and exclusively managing a file containing a name and all parameters of said software audio plug-ins by said control system of said mixing console such that said control system of said mixing console controls all the parameters of said software audio plug-ins on said computer.

5. A method in accordance with claim 4, wherein in allocating a plug-in to an effects slot, free audio tie lines are automatically occupied for said effects slot and again released, when the respective effects slot is deactivated.

6. A method in accordance with claim 4, wherein the allocation of the software audio plug-ins to a respective FX slot as well as the audio tie lines are carried out in a highest file instance of the control system of the mixing console.

7. A method in accordance with claim 4, wherein the data set of the software audio plug-in is stored completely in a snapshot or in a pass of a dynamic automation of the control system of the mixing console and when the snapshot or the automation pass is reproduced, the software audio plug-ins are parameterized on the computer automatically with the data of the respective data set from the control system.

8. A method in accordance with claim 7, wherein the stored data from the control system of said mixing console can be transferred onto the control system of another mixing console.

9. A method in accordance with claim 4, wherein when a software audio plug-in cannot be found on the computer when an audio production and/or data set is loaded, the data concerning the audio software plug-in are ignored, but the production, snapshot and automation data are loaded.

10. A method in accordance with claim 4, wherein windows of the graphic user interface of the software audio plug-ins are completely transferred by means of an RDP client installed on the mixing console to a display unit of the mixing console.

11. A method in accordance with claim 10, wherein windows of the software audio plug-in on the computer are automatically switched to full frame and in this way other menu and task bars are hidden on the display unit, so that only the windows of the software audio plug-in are displayed on the display unit and direct access to the computer is blocked in this way.

12. A method in accordance with claim 4, wherein the mixing console is provided with a graphic user interface (GUI).

13. A method in accordance with claim 6, wherein the data set of the software audio plug-in is stored completely in a snapshot or in a pass of a dynamic automation of the control system of the mixing console and when the snapshot or the automation pass is reproduced, the software audio plug-ins are parameterized on the computer automatically with the data of the respective data set from the control system.

14. A method in accordance with claim 10, wherein windows of the software audio plug-in on the computer are automatically switched to full frame and in this way other menu and task bars are hidden on the display unit, so that only the windows of the software audio plug-in are displayed on the display unit and direct access to the computer is blocked in this way.

15. A computer and audio mixer device for using software audio plug-ins, the device comprising:

a mixing console comprising a control panel, a plurality of effects slots and an electronic signal-processing system;

at least an audio tie line for audio data transmission;

a control cable; and a computer comprising an audio interface and an audio plug-in host, said audio interface comprising software audio plug-ins, said software audio plugs-ins comprising a name and parameters of data, said audio plug-in host receiving at least a plurality of said software audio plug-ins, said mixing console having a plug-in control system, said mixing console assigning each of said audio software plug-ins to one of said plurality of effects slots, said computer and said mixing console being connected via the at least said audio tie line and at least one said control cable for audio data transmission, said plug-in control system of said mixing console exclusively managing said parameters of data of said audio software plug-ins, said audio software plug-ins being controlled exclusively from the mixing console, wherein sound is altered based on said one or more audio software plug-ins via said mixing console.

16. A device in accordance with claim 15, further comprising:

another audio tie line to form at least a plurality of audio tie lines, wherein in assigning one of said software audio plug-ins to one of said effects slots, free audio tie lines are automatically occupied for said effects slot and again released, when the respective effects slot is deactivated via said plug-in control system of said mixing console.

17. A device in accordance with claim 15, wherein said software audio plug-ins correspond to software-based implementations for one of changing sound and producing sound.

* * * * *